United States Patent [19]

Salisbury

[11] Patent Number: 5,407,631

[45] Date of Patent: Apr. 18, 1995

[54] CASTING PROCESS FOR MAKING GLASS FIBER PREFORMS

[75] Inventor: Wayne C. Salisbury, Middleton, N.H.

[73] Assignee: Davidson Textron Inc., Dover, N.H.

[21] Appl. No.: 142,139

[22] Filed: Oct. 28, 1993

[51] Int. Cl.⁶ .............................................. B29C 4/18
[52] U.S. Cl. ................................. 264/517; 264/128; 264/301; 264/302; 264/309; 264/511
[58] Field of Search ............... 264/128, 112, 301, 302, 264/309, 511, 40.3, 517

[56] References Cited

U.S. PATENT DOCUMENTS

| | | | |
|---|---|---|---|
| 2,827,666 | 3/1958 | Wagner | 264/128 |
| 3,170,197 | 2/1965 | Brenner . | |
| 3,193,440 | 7/1965 | Schafer . | |
| 3,410,936 | 11/1968 | Juras | 264/128 |
| 3,437,508 | 4/1969 | Gorski | 264/128 |
| 3,791,783 | 2/1974 | Damon et al. . | |
| 3,962,753 | 6/1976 | Dunn | 264/517 |
| 4,061,485 | 12/1977 | Rimmel . | |
| 4,228,123 | 10/1980 | Marshall | 264/128 |
| 4,664,864 | 5/1987 | Wersosky . | |
| 4,795,335 | 1/1989 | Farrington et al. | 264/511 |
| 4,946,638 | 8/1990 | Takamatsu | 264/302 |
| 5,041,260 | 8/1991 | Johnson et al. . | |
| 5,093,963 | 3/1992 | Farrington et al. | 264/511 |

*Primary Examiner*—Allan R. Kuhns
*Attorney, Agent, or Firm*—Reising, Ethington, Barnard, Perry & Milton

[57] ABSTRACT

A method and apparatus are disclosed for making preforms from a fibrous material such as glass fibers. The apparatus includes a porous mold form that, in carrying out the method, is attached over the open face of a charge box. The charge box and mold form are then rotated as a single unit to dump glass fibers or other fiberous reinforcement held in the charge box onto the mold form. Air is drawn through the porous mold form to thereby retain a layer of the glass fibers against the mold form. The mold form and charge box are rotated back to their initial position and then disconnected. A binder is sprayed onto the glass fibers if not otherwise already applied thereto. The binder is then cured, resulting in a unitary glass fibers preform.

10 Claims, 3 Drawing Sheets

CASTING PROCESS FOR MAKING GLASS FIBER PREFORMS

TECHNICAL FIELD

The invention relates generally to a process for making preforms from chopped fibers and, in particular, relates to a slush molding process for making glass fiber preforms on a vacuum-assisted form.

BACKGROUND OF THE INVENTION

Random continuous glass mat is increasingly being used in the construction of composite automobile interior trim structures. The random mat is formed by showering molten glass onto a moving conveyor belt. The glass is showered from a rotating head and is directed perpendicular to the direction of movement of the conveyor belt.

In forming automobile interior trim structures, a section of the random mat is typically cut to an appropriate shape (e.g., a door panel) and then draped over a mold surface. A resin is then poured or injected into the mold as part of a resin transfer molding process. The resin process can be, for example, a structural reaction injection molding (SRIM) resin, a low density matt molding resin process or otherwise. The resultant composite part is light-weight yet structurally suitable for various interior trim parts, such as door panels, quarter panels, instrument panels, package trays, and more.

When structures having a fairly complex geometry are needed, the random glass mat must be preformed to the approximate shape of the molding tool. This increases the complexity of manufacturing the trim structures because it typically requires an extra step in which the random mat is compression molded to the approximate shape of the tool. Consequently, other means of manufacturing a glass fiber preform having the properties of random continuous glass mat have been investigated.

One such manufacturing process, known as directed fiber, uses chopped glass fiber and a binder to form a glass fiber preform. In the directed fiber process, chopped glass fibers are sprayed against a screen having the shape of the desired preform. Air is drawn through the screen as the glass fibers are applied to hold the glass fiber onto the screen. Binder is either sprayed over the applied glass fiber or sprayed onto the screen along with the glass fiber. Heat is then applied to cure the binder. The preform is then cooled and remove from the screen. Using chopped glass of one to six inches in length, this process produces a preform having physical properties similar to random continuous glass mat.

Various examples of directed fiber systems are disclosed in U.S. Pat. Nos.: 3,170,197, issued Feb. 23, 1965 to I. G. Brenner; 3,193,440, issued Jul. 6, 1965 to K. A. Schafer; 3,791,783, issued Feb. 12, 1974 to R. L. Damon et al.; 4,061,485, issued Dec. 6, 1977 to C. F. Rimmel; and 5,041,260, issued Aug. 20, 1991 to C. F. Johnson et al.

One disadvantage of the directed fiber process is that it requires the relatively time-consuming step of spraying the chopped glass onto the screen, whether by an operator or robot. Also, because a certain amount of the glass fibers being sprayed does not adhere to the screen, the directed fiber process results in glass being wasted.

Molding processes other than directed fiber that utilize a screen or other porous molding surface have been disclosed. U.S. Pat. No. 3,193,440, issued Jul. 6, 1965 to K. A. Schafer, discloses a process for making laminated articles. In that patent, a screen is dipped into a container of foamed polyurethane fragments as suction is applied to the backside of the screen. Binder is then sprayed and cured. The layer of foamed fragments is then placed in a mold with a preform fiberglass mat for lamination of the two layers. Additionally, Schafer discloses forming a laminate by first applying a layer of glass fibers to the screen, then applying a layer of the foamed polyurethane fragments, and then applying a binder.

There are, however, disadvantages in dipping the screen into the container of fragments. Since the surface of the screen typically has a relatively complex geometry, uniform coating of the screen may not occur, with the portions of the screen located farther from the charge in the container being less likely to have as thick a coverage of the fragments as the closer portions of the screen. Also, such a process is best suited for foamed polyurethane fragments which are lightweight and are therefore easily drawn upward by the airflow through the screen. Glass fibers on the other hand are relatively heavy, making it more difficult to draw them up from the surface of the charge of fiberglass.

Many types of processes that relate generally to forming layers from fragmented materials are known outside of the field of fiber preform fabrication. For example, slush molding has been used to form thermoplastic layers of polyvinyl chloride (PVC). That process uses a mold tool having a solid surface in the shape of the desired part. The mold is preheated and clamped to a powder box containing a charge of dry thermoplastic particles. The mold and powder box are rotated as a single unit until the thermoplastic material is dumped onto the mold surface. A portion of the thermoplastic material attaches and remains on the mold surface while the mold and powder box are rotated together back to their initial position. The mold is disconnected from the powder box and further heated to cause the attached thermoplastic material to fuse together to thereby form a continuous layer of thermoplastic material. An example of the slush molding process is described in U.S. Pat. No. 4,664,864, issued May 12, 1987 to J. M. Wersosky.

SUMMARY OF THE INVENTION

The present invention provides a method and apparatus for forming a glass fiber preform that eliminates the time consuming step of spraying fibers onto a screen, yet can provide a preform having a complex shape and characteristics similar to random continuous glass mat. The method and apparatus can suitably be used with other types of fibrous materials as well.

In accordance with the invention a method is provided for forming a fibrous preform. The method comprises the steps of: (a) providing a porous surface in a charge box containing segments of a fibrous material to thereby define a chamber having the porous surface positioned in open communication with the interior of the charge box; (b) supplying the fibrous material from the charge box onto the porous surface; (c) disconnecting the charge box from the porous surface; (d) applying a binder to the fibrous material; (e) heating the binder to a temperature sufficient to bind the fibrous material together; and (f) drawing a fluid through the porous surface during steps (b) through (e) to hold the binder and the fibrous material to the porous surface. Preferably, step (b) is preformed by rotating the chamber from an initial position to an inverted position and then back to the initial position.

The binder can be (1) sprayed onto the fibrous material either during or after the fibrous material is applied to the porous surface, (2) added in dry form to the charge box prior to step (a), or (3) applied to the fibrous material before the fibrous material is placed in the charge box.

In accordance with another aspect of the invention, the thickness of the layer of fibrous material can be controlled (1) by varying the surface density of the interstices that form the porous surface from one region of the porous surface to another, (2) by controlling the amount of fibrous material contained in the charge box, or (3) by controlling the strength of the vacuum used to draw the fluid, preferably air, through the porous surface.

A mold assembly used for carrying out the method of the present invention is also provided. The mold assembly includes a form having a porous surface, a charge box having an open face, with the form being removably attachable over the open face of the charge box such that the porous surface is in open communication with the interior of the charge box, means for rotating the charge box and the form when the charge box is attached to the form to thereby supply a fibrous material contained in the charge box onto the porous surface, and a low pressure source attached to the form for drawing a gas through the porous surface of the form to thereby retain fibrous material against the porous surface.

In accordance with a further aspect of the invention, the mold assembly includes a nozzle for spraying a binder onto the fibrous material disposed on the porous surface, as well as heat source for heating the material disposed on the porous surface.

In accordance with yet a further aspect of the invention, the form is constructed to result in a larger thickness of fibrous material being built up on one region of the form than on another region of the form. This can be accomplished by forming the porous surface from interstices through which the gas can flow. The average spacing between the interstices can then be varied for different regions to control the volume of gas flow through that region of the porous surface. Alternatively or additionally, the thickness can be varied from region to region by varying the average size of the interstices from one region to another.

BRIEF DESCRIPTION OF THE DRAWINGS

The preferred exemplary embodiments of the present invention will hereinafter be described in conjunction with the appended drawings, wherein like designations denote like elements, and.

DESCRIPTION OF THE PREFERRED EMBODIMENT

Figure 1:
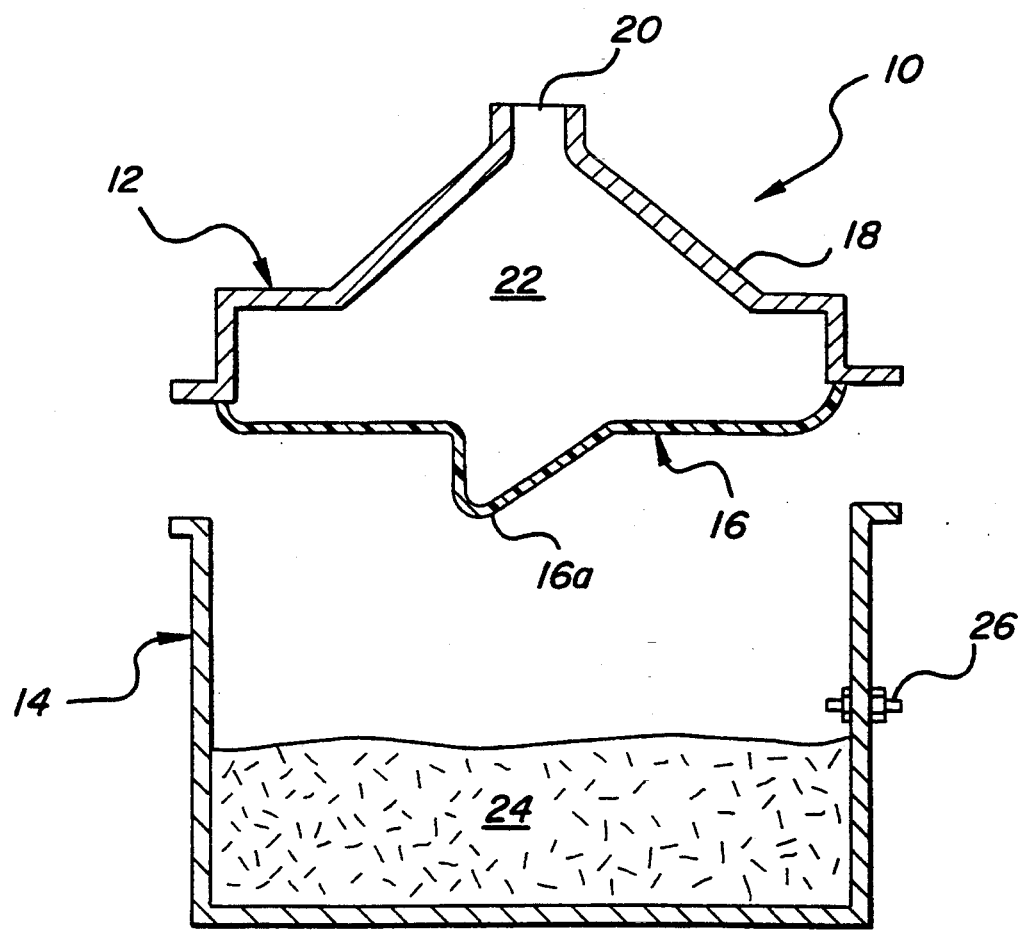
FIG. 1 is a cross-sectional view of a preferred embodiment of the mold assembly of the present invention, showing the mold form positioned above the charge box.

Referring now to the drawings, an exemplary embodiment of the method and apparatus of the present invention will now be described in connection with the formation of a glass fiber reinforcing preform for an automobile interior trim structure.

As shown in FIG. 1, a mold assembly 10 of the present invention includes a mold form 12 and a charge box 14. Form 12 includes a porous segment 16 having a surface 16a shaped to correspond to the desired geometry of the finished reinforcing preform. Form 12 also includes a mold frame 18 having an air outlet 20. Porous segment 16 is secured to mold frame 18 to define a plenum 22 into which air can flow via either porous segment 16 or air outlet 20. Charge box 14 is partially filled with a charge of glass fibers 24 out of which the reinforcing preform is to be made. Charge box 14 also includes a vent 26 that allows air flow into charge box 14 when charge box 14 is attached to mold form 12.

Figure 2:
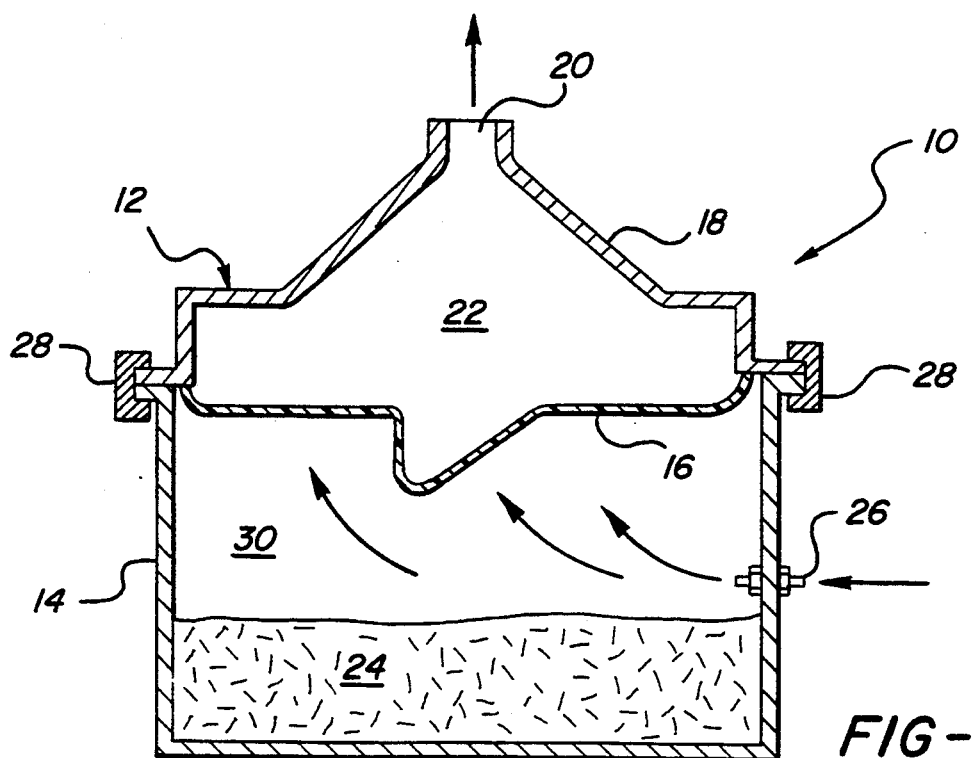
FIG. 2 depicts the mold form and charge box of FIG. 1 clamped together to form a chamber oriented in its initial position.
Figure 3:
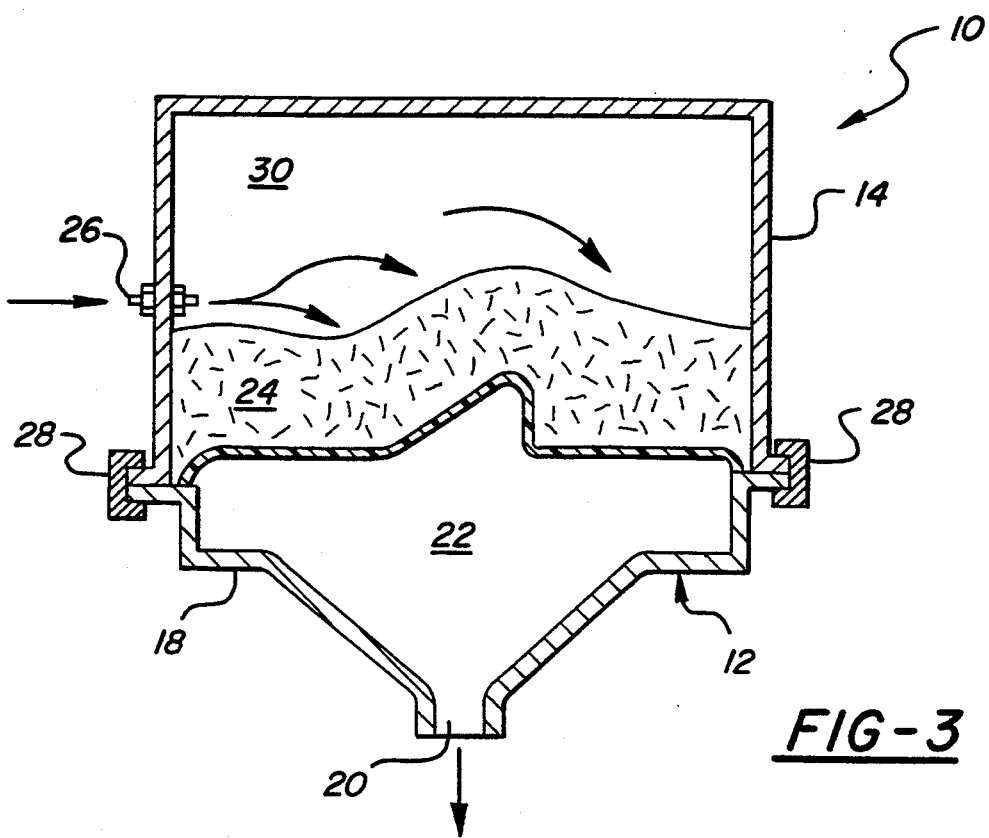
FIG. 3 shows the chamber of FIG. 2 in its inverted position in which glass fibers in the charge box are applied to the surface of the mold form.

Referring now also to FIGS. 2 and 3, mold assembly 10 further includes a clamp or clamps 28 which secure and seal mold form 12 to charge box 14 to prevent glass fibers 24 from escaping therebetween. When clamped together, mold form 12 and charge box 14 form a sealed mold chamber 30. As indicated by the arrow directions, air flows into chamber 30 only via vent 26 and out of chamber 30 only via porous segment 16. Vent 26 can be a butterfly valve or other suitable means for providing air into chamber 30, while preventing the charge in chamber 30 from escaping. Also, although only a single vent 26 is depicted, it will be appreciated that a plurality of such vents could be utilized to provide a more uniform flow of air through porous segment 16.

Porous segment 16 can be formed of any material having interstices through which a fluid, such as air, can pass. For example, porous segment 16 can be a steel screen coated with a non-stick material, such as Teflon TM. Porous segment 16 should have sufficient rigidity to withstand being deformed by the weight of the glass fibers 24 lying upon it when mold chamber 30 is in its inverted position.

As will be explained in greater detail below, a preferred method of the present invention includes rotating the mold chamber 30 between its initial position (shown in FIG. 2) and an inverted position (shown in FIG. 3). To effect this rotation, mold form 12, charge box 14, and clamps 28 are rotatably supported as a single unit by any suitable means, such as that described in the aforementioned U.S. Pat. No. 4,664,864, issued May 12, 1987 to J. M. Wersosky, hereby incorporated by reference.

Air is drawn through mold chamber 30 and plenum 22 by connecting air outlet 20 to a low pressure source, such as the suction side of a blower (not shown). Such an arrangement for drawing air through porous segment 16 is shown in the aforementioned U.S. Pat. No. 3,170,197, issued Feb. 23, 1965 to I. G. Brenner, hereby incorporated by reference. As will be appreciated by those skilled in the art, air outlet 20 can be connected to the low pressure source by flexible tubing or a rotary joint to permit mold assembly 10 to be rotated while air is drawn through chamber 30.

Figure 4:
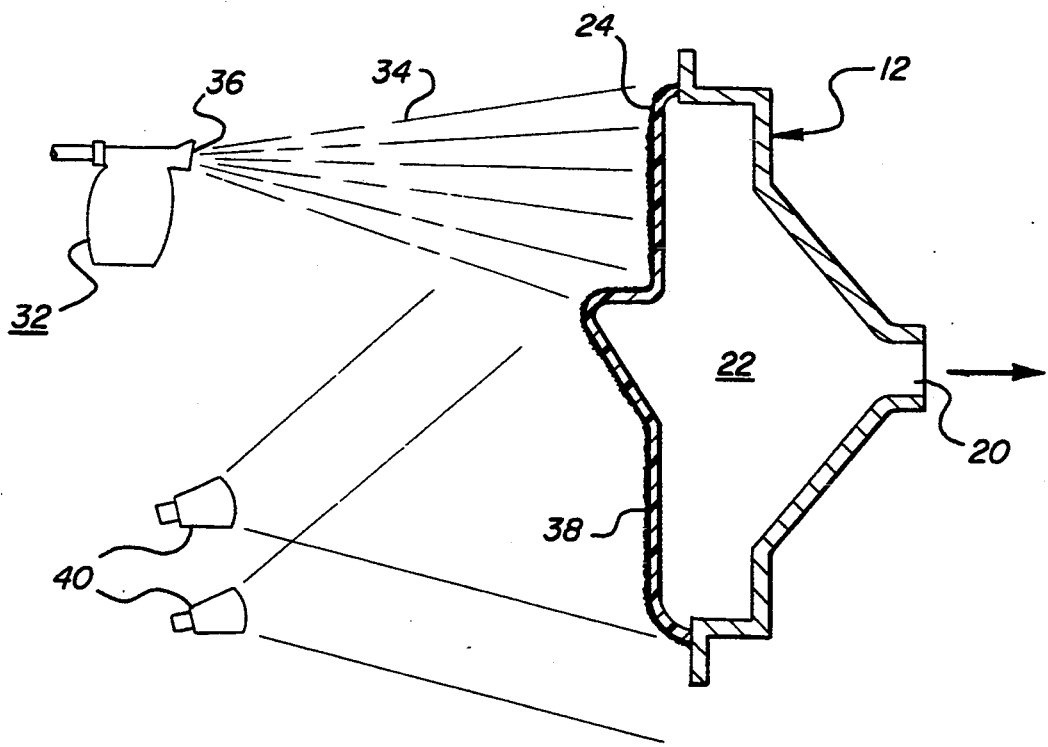
FIG. 4 shows a spray nozzle for applying binder to the glass fibers disposed on the surface of the mold form and a bank of heat lamps for curing the binder applied to the glass fibers.

Referring now to FIG. 4, mold assembly 10 can include a spray apparatus 32 for spraying a binder 34 to the glass fibers 24 that are disposed on porous segment 16 as a result of the dump process of FIGS. 2 and 3. Spray apparatus 32 includes a nozzle 36 through which the binder 34 is sprayed. Preferably, a reciprocator is used, the construction of which is well known to those skilled in the art. Any suitable binder can be used, such as a water urethane emulsion. Although the particular means for applying binder 34 to glass fibers 24 is shown as a spray apparatus, the invention also lends itself well to using a powdered binder that is added to charge box 14 along with glass fibers 24. Binder 34 could also be applied to glass fibers 24 prior to placing glass fibers 24 into charge box 14. Whatever the means for applying binder 34 to glass fibers 24, a layer 38 composed of glass fibers 24 and binder 34 is produced on porous segment 16.

Mold assembly 10 also preferably includes a bank of heat lamps 40 which direct heat onto the binder 34 that has been applied to porous segment 16. As is known by those skilled in the art, the heat operates to cure binder 34 to thereby form a unitary layer of glass fibers bonded together by the binder at the contact points between fiber segments while maintaining interstices in a mat that can be later impregnated with a suitable resin material, e.g., urethane such as in SRIM processes. As with the means for applying binder 34, the particular heat source used to cure binder 34 can include sources other than heat lamps. For example, instead of heat lamps 40, one or more catalytic gas heaters could be used. Also, binder 34 could be cured by drawing (and perhaps circulating) heated air through porous segment 16. Yet another means for curing binder 34 would consist of heating porous segment 16. Either of these latter means of heating binder 34 could advantageously be begun during dumping in the event binder has been added to the charge of glass fibers 24 or otherwise previously applied to glass fibers 24.

A preferred method of the present invention will now be described in connection with FIGS. 1-4. As shown in FIG. 1, mold form 12 and charge box 14 are not initially connected so that glass fibers 24 can be added to charge box 14 and so that the previous preform can be removed from porous surface 16a. As shown in FIG. 2, mold form 12 is then connected to the open face of charge box 14 by, for example, clamps 34. Air is then drawn through vent 26, porous surface 16a, and air outlet 20. As shown in FIG. 3, mold form 12 and charge box 14 which define mold chamber 30 are then inverted as a single unit to thereby dump glass fibers 24 onto porous surface 16a. The mold chamber 30 is then returned to its initial position, leaving a layer of glass fibers 24 on porous surface 16a due to the draw of air through porous surface 16a. Mold form 12 is then disconnected from charge box 14 while the draw of air through porous surface 16a continues. If not already incorporated into charge box 14 or onto glass fibers 24, binder 34 is then sprayed as shown in FIG. 4 onto the glass fibers 24 disposed on porous surface 16a to thereby form layer 38. Binder 34 is then heated to a temperature sufficient to bind the glass fibers 24 together, and then allowed to cool. The draw of air through porous surface 16a is then stopped and the finished preform can be removed from porous surface 16a.

The thickness of layer 38 can be controlled in various ways. To uniformly increase or decrease its thickness, the amount of suction through porous surface 16a can be increased or decreased, respectively. Alternatively, the amount (i.e., the head weight) of glass fibers 24 contained in charge box 14 can be varied to affect the thickness of layer 38. If it is desirable to vary the thickness of layer 38 from one region to another, then the size and/or spacings of the interstices of porous surface 16a through which the air flows could be varied.

It should be noted that, although FIG. 2 depicts the air being drawn through porous surface 16a while mold chamber 30 is in its initial position, the air draw need not be begun until glass fibers 24 have been dumped onto porous surface 16a, as in FIG. 3.

The present invention provides a means for developing a preform having properties similar to a random continuous mat using a process that is simpler than directed fiber. In particular, by using chopped glass fibers of one to six inches in length, the present invention can be used to create a preform having properties similar to random continuous glass mat, but which is less expensive to manufacture. The present invention can also be used to form complex geometries without the secondary compression molding step required when using random continuous glass mat. With respect to the directed fiber process, the present invention eliminates the time consuming step of having to precisely spray the glass fibers onto the porous segment of the form mold. Furthermore, the present invention results in a cleaner manufacturing process since no glass spraying is involved.

Another advantage of the method and apparatus of the present invention is that it simplifies the manufacturing of preforms composed of varying lengths or types of materials because the materials can simply be added in the desired proportions to charge box 14, rather than having to provide a separate spray nozzle for each material or special mixing apparatus for combining the different materials.

It will thus be apparent that there has been provided in accordance with the present invention a method and apparatus for forming a fibrous preform which achieves the aims and advantages specified herein. It will of course be understood that the foregoing description is of preferred exemplary embodiments of the invention and that the invention is not limited to the specific embodiments shown. Various changes and modifications will become apparent to those skilled in the art and all such variations and modifications are intended to come within the spirit and scope of the appended claims.

I claim:

1. A method of forming a fibrous preform, comprising the steps of:
   (a) providing a porous surface in relation to a charge box containing segments of a fibrous material so as to define a chamber having said porous surface positioned in open communication with the interior of said charge box,
   (b) supplying said fibrous material from said charge box onto said porous surface by rotating said chamber from an initial position to an inverted position to dump said fibrous material onto said porous surface and then rotating said chamber back to said initial position,
   (c) separating said charge box from said porous surface,
   (d) applying a binder to said fibrous material,
   (e) heating or reacting said binder to bind said fibrous material together, and
   (f) drawing a fluid through said porous surface during steps (b) through (e) to hold said fibrous material to said porous surface.

2. A method of forming a fibrous preform, comprising the steps of:
   (a) providing a porous surface;

(b) drawing a fluid through said porous surface;

(c) supplying a quantity of fibrous material onto the porous surface while the fluid is drawn therethrough for providing a layer of fibrous material on said porous surface, (d) rotating said porous surface such that a portion of said quantity of fibrous material falls away from said porous surface while the layer of said fibrous material is retained in place on said porous surface by the fluid drawn through said porous surface;

(e) applying a binder to said layer of said fibrous material retained on said porous surface while the fluid is drawn therethrough, and (f) heating or reacting said binder to bind said layer of said fibrous material together.

3. The method of claim 2, wherein step (e) further comprises spraying said binder onto said fibrous material.

4. The method of claim 2, wherein step (a) further comprises:

placing said porous surface in communication with a charge box containing said quantity of fibrous material such that said porous surface and said charge box together define a chamber, and rotating said chamber such that said quantity of fibrous material falls onto said porous surface.

5. The method of claim 4, wherein step (e) further comprising carrying out the following steps prior to step (a):

applying a binder to said fibrous material, and placing said fibrous material into said charge box.

6. The method of claim 4, wherein step (e) further comprising adding a powdered binder to said charge box prior to step (a).

7. The method of claim 4, further comprising the step of controlling the amount of said fibrous material contained in said charge box prior to step (c) to thereby control the thickness of said fibrous material disposed on said porous surface.

8. The method of claim 2, wherein step (a) includes providing a porous surface having interstices through which said fluid can flow and wherein the surface density of said interstices is different in one region of said porous surface than in another, whereby the thickness of said fibrous material disposed on said porous surface is different at said one region than at said other region of said porous surface.

9. The method of claim 2, further comprising the step of controlling the velocity of said fluid through said porous surface to thereby control the thickness of said fibrous material disposed on said porous surface.

10. The method of claim 2, wherein said fluid is air and said fibrous material comprises glass fibers.

* * * * *